Patented Nov. 30, 1948

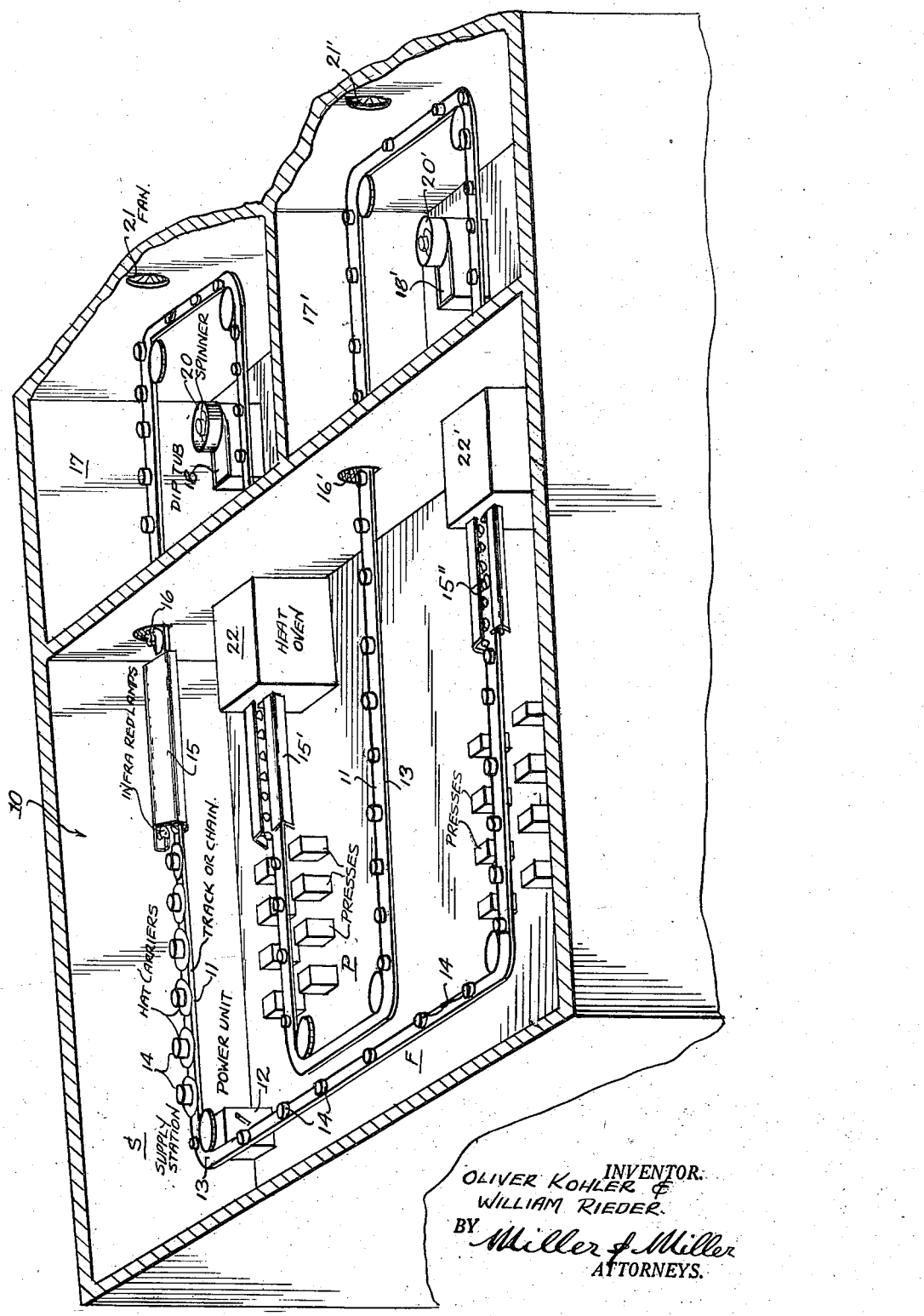

2,455,257

UNITED STATES PATENT OFFICE 2,455,257

PLANT FOR THE RAPID MANUFACTURE OF STRAW HATS

Oliver Kohler and William Rieder, Lebanon, Ill.; said Kohler assignor to Harris Langenberg Hat Co., St. Louis, Mo., a corporation of Missouri Application July 16, 1946, Serial No. 684,014

1 Claim. (Cl. 223—7)

This invention relates to the plant for the rapid manufacture of straw hats, and has for an object to provide a plant for manufacturing straw hats so rapidly that it may be considered an assembly line process.

In the present conventional process of manufacturing straw hats, it takes anywhere from ten to thirty-six hours to process a finished straw hat after the hat body is formed in any conventional manner, such as either by sewing or by the pullover method, or by any other known way of forming the hat body. Conventionally, the formed hat body is dipped in a lacquer, then hung on a hook or peg and turned by hand at frequent intervals to keep it from having streaks of lacquer or thick spots which are impossible to check completely. They are then placed on racks to dry for from ten to thirty-six hours, depending on temperature and humidity. If the humidity is above 60%, the hat will turn white or blush, decreasing the value of the finished hat, and necessitating the extra operation of removing the "blush" with a solvent. Such slow drying causes the hat to almost lose its shape as it sags from the additional weight of the excessive lacquer which cannot be removed by this old method. It is an object of this invention to provide a finished straw hat, of high value, in about seven minutes as compared to ten to thirty-six hours for the old process.

A further object of this invention is to provide a plant including an assembly line wherein the formed straw hat bodies can be processed through in about seven minutes as compared to the old process of about ten to thirty-six hours.

A further object of this invention is to provide a rapid assembly line plant for manufacturing straw hats.

A further object of this invention is to provide a plant for a straw hat finishing process of extreme rapidity.

In the drawing accompanying and forming part of this specification several embodiments of the invention are shown in which:

The figure is a perspective diagrammatic view of the plant including the assembly line provided for utilizing the process of this invention.

Inasmuch as the novelty of this invention lies in the plant including the assembly line, but not in the particular details of the mechanisms used in the assembly line, such details are, therefore, shown only diagrammatically.

The plant in which the process of this invention is performed includes an endless chain conveyor 11 operated at a suitable speed by power unit 12 over a suitable track 13. Mounted on the chain 11 are a plurality of hat carriers 14 (most of which are shown rather sketchily). The conveyor 11 extends under a battery 15 of infrared lamps in the primary room 10 of the plant through a window or opening 16 to a first secondary or lacquer-room 17. In the secondary or lacquer-room 17 a dip-tub 18 is provided containing lacquer maintained at 85°, and a hat spinner 20 adapted to rotate at 300 R. P. M. An exhaust fan 21 removes fumes from the secondary or lacquer-room 17.

The conveyor 11 passes out of lacquer-room 17 through an opening in its common wall and through an oven 22. The oven 22 is heated to about 150° by steam pipes or otherwise, and has a circulation of fresh preheated air, the air passing from the primary room 10 through oven 22 and through the opening in the common wall into the lacquer-room 17 and thence outwardly by exhaust fan 21. Next, the conveyor passes under a second battery 15' of infra-red lamps to between a series of hat presses 23. From here the conveyor 11 extends through a window or opening 16' in the common wall to a second secondary or lacquer-room 17', identical with the first secondary room 17, containing a dip-tub 18', hat spinner 20' and an exhaust fan 21'. It leaves the room 17' through an opening in its common wall and through an oven 22' and battery 15" of infrared lamps, and between a second series of presses 23' back to the power unit 12.

With this plant, a suitable number of operators must be provided at each necessary location. The formed hats will be brought to the supply station at S and placed on the hat carriers 14 by operators. Three groups of operators are provided in each of the lacquer-rooms 17 and 17'. The first group of operators in each lacquer-room removes the hats from the carriers 14 and nests them into groups of six to twelve hats, and dips them in the lacquer in the dip-tub 18 and 18'. A second group of operators remove the hats from the dip-tub and place them on the spinner, which is then rotated at about 300 R. P. M. for about a minute. The third group of operators takes them from the spinner and then separates them and places them on the now empty hat carriers 14 to continue on through the wall opening and the oven and battery of lamps to the presser station P, where another group of operators remove the hats from the carriers 14 and shape them on the presses.

When the hats come off the presses 23', they are finished, and may be removed for packing and shipping. If desired, the finished hat shipping station F may be located further along the conveyor at F just before the power unit 12, in which case the operators of presses 23' also return the hats to the hat carriers 14 to be removed and packed at finished shipping station F.

It will be noted that, starting at the first window 16, all the mechanism details are duplicated, and this is so because it is necessary to press and size a hat twice, hence duplicate mechanisms are provided to repeat the operation.

In this invention, the formed straw hats at supply station S are placed on the hat carriers 14, where they are carried under the lamp battery 15 to dehydrate the straw. Entering the lacquer-room 17, the hats are dipped in nested groups of six to twelve in pre-heated lacquer of about 85°; then spun for about one minute at about 300 R. P. M. The hats are then returned to the carriers to travel through the heating ovens, supplied with fresh pre-heated air at about 150°, which air is drawn through the oven and wall opening countercurrent to the moving hats and is exhausted by the exhaust fan in the lacquer room. Leaving the oven, they pass a second drying lamp battery to the operators at the presser station P. These same steps are then repeated, and the hats reach the finishing station F for shipping. Except when the hats are in the dip tub and spinner or on the presses, they are in continuous motion on the conveyor, and by providing an appropriate number of operators at each station or location, it takes only about seven minutes for each hat to travel from supply station S to finished shipping station F. If a smaller number of operators are provided, it would take somewhat longer, as it would not be possible to thus keep all the hat carriers filled at all times; but even so the hat will be finished in a few minutes by the process of this invention as compared to hours by the conventional processes.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus set forth and disclosed the nature of this invention, what is claimed is:

A plant for the rapid manufacture of straw hats comprising a primary room and a pair of secondary rooms, each of said secondary rooms having a common wall with said primary room, an assembly line comprising a hat conveyer system extending from said primary room through an opening in its common wall to the first of said secondary rooms, back through another opening in said same common wall to said primary room, then through an opening in its common wall to the second of said secondary rooms and then back through another opening in said last mentioned common wall to said primary room, said hat conveyer system assembly line including a plurality of hat heat drying stations, each drying station being adjacent one of said openings, a plurality of presser stations located in said primary room and hat lacquering stations located in said secondary rooms, and exhaust means leading outwardly through a wall of each of said secondary rooms, whereby each said exhaust means serves to exhaust heated air from said primary room along said hat conveyer system through said hat drying stations and said common wall openings to said secondary rooms and thence outwardly.

OLIVER KOHLER.
WILLIAM RIEDER.

REFERENCES CITED

The following references are of record in the file of this patent:

UNITED STATES PATENTS

| Number | Name | Date |
| --- | --- | --- |
| 166,764 | Fuller | Aug. 17, 1875 |
| 1,356,992 | La Selle | Oct. 26, 1920 |
| 2,039,911 | Lee | May 5, 1936 |